Feb. 17, 1970    B. G. COPPING ET AL    3,495,291
CONTAINER RINSER APPARATUS
Filed March 18, 1968    3 Sheets-Sheet 1
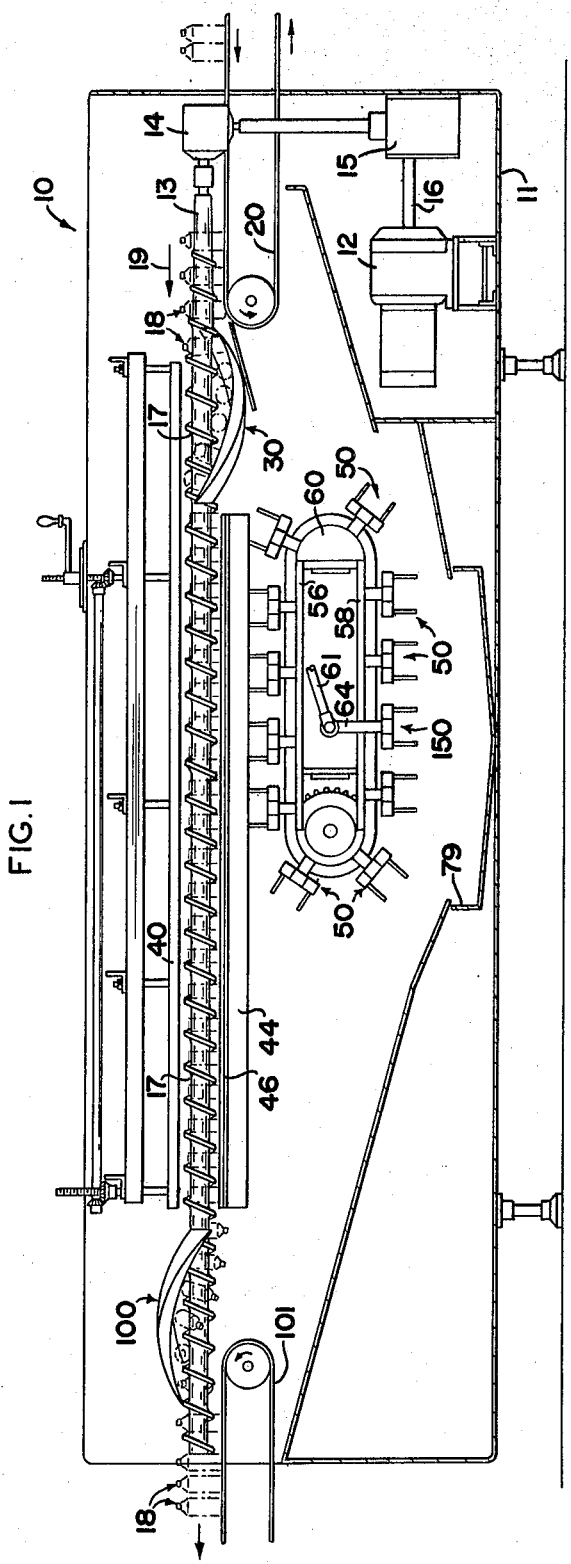
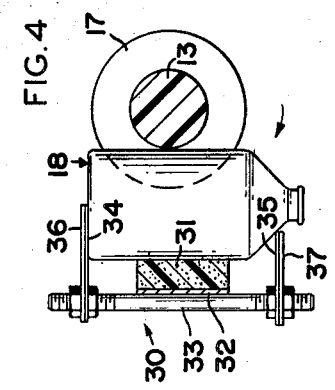
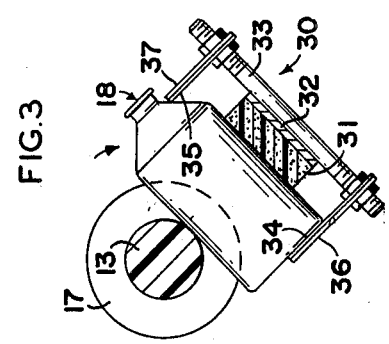
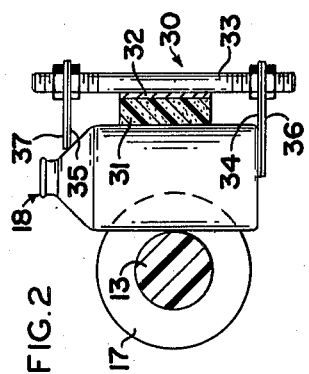
INVENTORS
BRUCE G. COPPING
GLENN B. TROWBRIDGE
BY
*Oldham & Oldham*
ATTORNEYS.

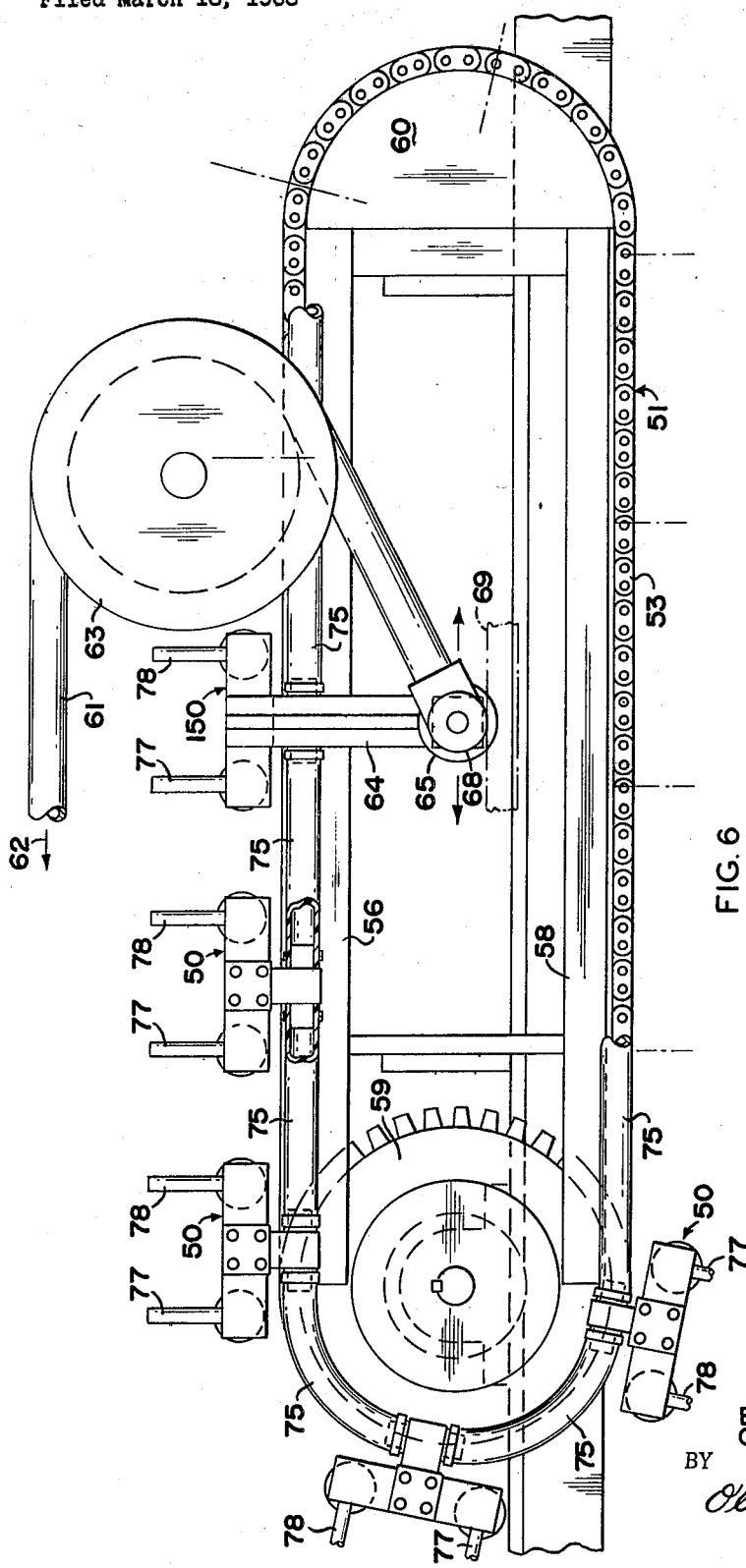

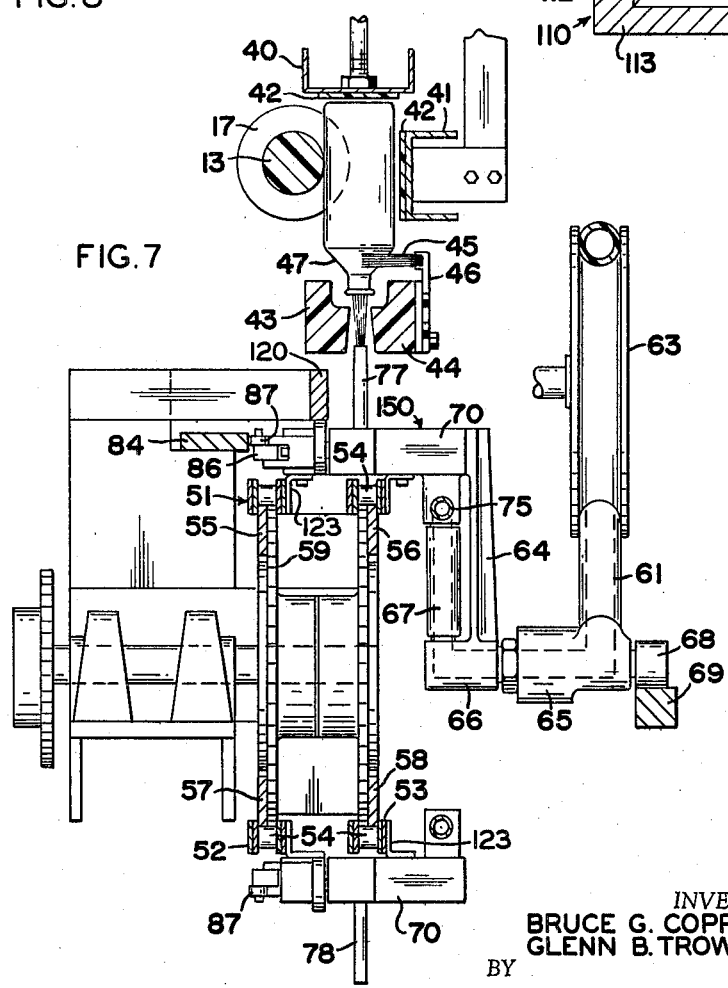

United States Patent Office 3,495,291
Patented Feb. 17, 1970

3,495,291
CONTAINER RINSER APPARATUS
Bruce G. Copping, Akron, and Glenn B. Trowbridge, Stow, Ohio, assignors, by mesne assignments, to Automatic Sprinkler Corporation of America, Cleveland, Ohio, a corporation of Ohio
Filed Mar. 18, 1968, Ser. No. 713,840
Int. Cl. B65g 47/24; B67c 1/06
U.S. Cl. 15—304                                        10 Claims

ABSTRACT OF THE DISCLOSURE

This apparatus includes a driven threaded worm and means for supplying upright cylindrical containers to the worm for engagement therewith and movement therealong. Curved elongate means are present to engage the containers, retain them in engagement with the worm and to invert the containers. Guide means engage the inverted containers and retain them in engagement with the worm for movement therealong in a fixed horizontal path while driven means are provided movable along under the fixed path at the same speed as the containers are moved by the worm for injecting streams of fluid into such containers for rinsing action. Second curved elongate means are present to engage the containers, retain them in engagement with the worm and for turning such containers upright.

---

Heretofore there have been various types of bottle rinsing and/or washing machines provided, but there is a particular need for a compact, sturdy, efficient apparatus that will rapidly and positively rinse new containers, such as bottles, when they are received in the bottle filling plant and prior to filling the same with a beverage or other material. Such rinsing action need not be as thorough, or complete as when containers, such as bottles, are returned to a bottling plant for cleaning and reuse.

It therefore is the general object of the present invention to provide a compact, positive functioning apparatus for rinsing or cleaning of containers, and particularly new containers, such as bottles to be filled with a consumable beverage, such as a soft drink or beer.

Another object of the invention is to provide improved means for receiving, automatically, containers as fed to the machine in an aligned row of bottles and which are inverted automatically by the apparatus, rinsed while in the inverted position, drained, and then turned upright by the apparatus for the delivery to other container processing apparatus for filling or other action.

A further object of the invention is to provide driven jet spray means adapted to be moved along in the machine of the invention under and parallel to the inverted containers as moved along through the apparatus whereby a stream of jet fluid can be sprayed into the container from its lower open end for rinsing the container.

Yet a further object of the invention is to provide a jet air spray device usable in apparatus of the invention and wherein the jet spray nozzle can be moved vertically to be introduced into a moving container for introducing a compressed air cleaning jet into the container while it is being moved through the apparatus of the invention.

The foregoing and other objects and advantages of the invention will be made more apparent as the specification proceeds.

Attention now is particularly directed to the accompanying drawings, wherein:

FIG. 1 is a side elevation, with a portion of the apparatus removed for clarity, of means embodying the principles of the invention;

FIG. 2 is a fargmentary vertical section of the bottle engaging and inverting means at the initial engagement of such means with a bottle;

FIG. 3 is another fragmentary vertical section, similar to FIG. 2, as the bottle has been moved longitudinally to the apparatus a short distance and is starting to be turned;

FIG. 4 is a fragmentary vertical section, similar to FIG. 2, of the bottle as inverted by the apparatus and just prior to disengagement with the bottle inverting means;

FIG. 5 is a fragmentary broken away, partly sectioned, elevation of a portion of the container inverting means;

FIG. 6 is an enlarged side elevation, partially broken away and shown in vertical section, of the jet spray means of the apparatus shown in FIG. 1;

FIG. 7 is a fragmentary enlarged vertical section taken through a portion of the jet spray means of the apparatus and the bottle positioning and movement means directly above such jet spray apparatus;

FIG. 8 is a plan view of a jet spray head of the apparatus of FIG. 6 with a portion of such jet spray head being broken away and shown in horizontal section; and FIG. 9 is a fragmentary vertical section through a modification of the jet spray means of FIG. 8 adapted for use with an air spray cleaner mechanism.

When referring to corresponding members shown in the drawings and referred to in the specification, corresponding numerals are used to facilitate comparison therebetween.

With reference to the details of the structure shown in the drawings, a container rinsing apparatus is provided and is indicated as a whole by the numeral 10. Such apparatus 10 is shown to include a suitable frame 11 only portions of which are illustrated in the drawings and with other portions of the frame means being removed for clarity so that a diagrammatic showing of the frame 11 is provided. The apparatus 10 further includes one or more drive means, such as a motor 12 carried by the frame 11. A worm or threaded shaft 13 is positioned in the upper portion of the apparatus 10 and the upstream end of this worm 13 connects, as by a suitable support and drive device 14 to a gear box speed reducer or equivalent means 15 that in turn connects to an output shaft 16 of the motor 12 whereby the worm 13 can be driven at a controlled speed. This worm 13 extends longitudinally of the frame 11 and apparatus 10 and the pitch of threads 17 thereon is such that it is greater than the diameter of the containers to be processed in the apparatus 10 so that the containers can be received between adjacent threads.

At the upstream end of the apparatus 10, a plurality of containers, such as bottles 18, are fed into the apparatus in any conventional manner and usually with a stream of bottles being abutted as they are introduced into the apparatus 10 for processing therein. These bottles 18 are moving in the direction indicated by the arrow 19 and may be fed into the apparatus by guides and means, such as a driven endless belt 20 or similar member, on which the bottles 18 are carried.

The upstream end of the worm 13 overlaps the downstream end of the driven belt 20, and the bottles are suitably brought into engagement with the thread 17 on the worm 13, as by gradually reducing such thread to the base diameter of the shaft forming the worm 13 for gradual engagement therebetween. The containers move through a fixed path in the apparatus 10.

It is one of the features of the present invention that curved, elongate means, indicated as a whole by the numeral 30, are provided to engage with the bottles 18 as they are moved along into the apparatus 10 and which means is adapted to retain the bottles against the threads 17 on the worm 13 while the bottles are turned through 180° for processing in the apparatus in inverted condition. This means or bottle inverting device 30 is shown to comprise a resilient cushion strip 31, made from any suitable material such as foamed plastic material, and/or foam rubber or the like, and which strip 31 is suitably secured, as by a conventional adhesive to a metal back plate or strip 32, this strip is suitably formed to an elongate curve of about 180° to facilitate forcing the bottles 18 against the worm 13 and affecting the desired 180° movement and inversion thereof down and around the worm. The metal back plate or strip 32 is shaped to a curve centered on the centerline of the worm 13 and is generally of a shape that would be tangent to the worm if moved radially inwardly for contact therewith. To aid in the engagement of the bottles with the right hand threaded worm, but yet to permit movement of the containers around with the worm as the containers are moved longitudinally by the worm and inverted by the movement of the worm and the associated guide means 30, a plurality of elongate bolts 33 or similar means are suitably secured to the metal back plate 32 and extend perpendicularly to the longitudinal axis of such strip. The bolts 33 extend appreciably laterally from the strip 32, as indicated in FIGS. 2, 3 and 4 of the drawings. Adjustably attached to each of the threaded ends of the bolts 33 are resilient flaps or strip sections 34 and 35 which extend from the bolts 33 towards the worm 13, as indicated in the drawings, and with the sections 34 being positioned to engage the bases of the bottles or containers 18 and with the sections 35 being formed to such lengths as to engage with a neck area such as the neck or shoulder portions of the bottles or containers as they are being inverted. Normally, the sections 34 and 35 are provided in longitudinally overlapped relationship on the means 30 or are at least in closely spaced end edge abutting relation so that the sections 34 and 35 combine to form elongate curved guides in laterally spaced association with the continuous resilient strip 31 and metal strip 32 to retain the bottle in proper association with such means 30 but yet to provide the desired inversion thereof. Preferably the strips or sections 34 and 35 each also have metal back-up plates 36 and 37 each usually of substantially the same length as its associated sections 34 and 35, respectively, whereby the back-up plates 36 and 37 prevent excessive deflection of the flexible sections 34 and 35 and provide, in effect, a stepped but continuous elongate curve extending over an arc of approximately 180° in the apparatus. Preferably, these back-up or side plates 36 and 37 are cut from a metal strip that has been formed to substantially a 180° elongate curve forming side plates or edges for the metal back-up plate or strip 32 and then such strip is cut into the different sections and properly associated with the carrier bolts 33 in the means 30. It will be realized that any suitable materials can be provided to form the resilient sections 34 and 35 and with low friction plastic material, such as polyurethane, nylon or polyethylene, usually being used to form these plates in slidable engagement with the bottles being processed and turned in the apparatus of the invention.

The guiding and turning means 30 can be secured to the frame 11 by any conventional means, not shown, that normally would engage the metal back plate or strip 32 and secure such member to the frame 11, usually in removable engagement therewith, whereby the guide and turning means 30 can be replaced readily for engaging with different sizes of containers or bottles being processed in the apparatus 10. The means 30 is shown diagrammatically in FIG. 1 for clarity.

FIG. 7 shows the bottles or containers 18 are retained in engagement with the worm 13 for movement along in a fixed path while retained in effective engagement with the worm, as by means of an adjustably positioned top guide 40 and a side guide 41. These guides 40 and 41 may have a low friction plastic surface layer 42 suitably secured thereto. The guides 40 and 41 are secured to the frame 11 in any desired manner so that they can be adjusted in position to accommodate different sizes of articles or containers being processed. Usually, a pair of laterally spaced guides 43 and 44 are provided to engage the neck of the inverted bottle 18, if necessary, and aid in positioning it for controlled movement through the apparatus 10. However, normally, an elongate brush 45 is secured to the frame 11 as by a support bar or plate 46 attached to the end portions of the bristles forming the brush 45. These bristles 45 are substantially horizontally extending and are made from conventional materials but are of sufficient number, size and strength that the bristles 45 will engage the shoulder portion 47 of the bottle 18 and will prevent the bottle from moving down to bear on the bottom guides 43 and 44 whereby the open mouth of the neck of the bottle is positioned between the space guides 43 and 44 so that a rinsing fluid or liquid can be sprayed up into the bottles 18 for rinsing and/or cleaning the same as moved through the apparatus 10.

Details of the rinsing apparatus or means are best shown in FIGS. 6, 7 and 8 of the drawing. The drawings show that a plurality of spray heads 50 are provided in equally spaced longitudinal relationship to each other and are secured to and carried by suitable means, in this instance, an endless roller chain 51 that comprises a pair of laterally spaced roller chains 52 and 53 that are secured together in any suitable manner for unitary action therebetween, as by being secured to and/or carrying the various individual spray heads 50. Each of these roller chains 52 and 53 includes a plurality of rollers 54 journalled thereon and these rollers are adapted to engage means such as a plurality of longitudinally extending support bars 55, 56, 57 and 58 that engage, respectively, the roller chain 52 for its upper and lower courses of movement and with the support bars 57 and 58 engaging the roller chain 53 to control, in general, its upper and lower course of fixed movement in the apparatus 10. A driven sprocket 59 also engages the roller chain 51 for drive thereof and such sprocket is suitably connected to any conventional drive means, usually the motor 12, in the apparatus. To keep the roller chain 51 tight and prevent any undesired sagging or looseness in the orbital course of movement thereof, preferably an end plate 60 having a semi-circular periphery is secured to the frame 11 in a suitable manner to engage and position the roller chain 51 at its arcuate portion of movement at the opposite end of the roller chain orbit from the sprocket 59. FIG. 7 of the drawings indicates that the sprocket 59 has the support bars 55 and 57 associated therewith, as indicated in FIG. 6, extending substantially tangentially of the sprocket at diametrically opposed portions of the sprocket to maintain the roller chain 51 taut and avoid slackness therein until the roller chains is in good effective driving engagement with the sprocket 59.

In order to provide rinsing fluid, in this instance a liquid to the individual spray heads 50, a flexible supply tube or line 61 is provided and it connects to a source of rinsing liquid, usually water, under suitable pressure, and which source is not shown, and which flexible supply line 61 has slight tension on it in the direction of the arrow shown at 62. This supply line 61 extends around a suitable roller guide 63 and normally connects to an extension arm 64 secured to one spray head 150 and extending radially inwardly therefrom to terminate on the axial center line of movement of the roller chain 51. The supply line 61 connects to the extension arm 64 in a conventional manner, as by a rotary coupling 65 suitably secured to and connecting to a fitting 66 carried by the extension arm 64 at its end and positioned on the axial center line of movement of the roller chain 51. The rotary coupling 65 and its connection to the hose or line 61 is supported by a roller 68 engaging a support bar 69 carried by the frame 11.

Each of the spray heads 50 includes a frame or block 70 and each block 70 has a liquid storage chamber 71 formed therein a one end thereof, as by attaching an end plate 72 to the block 70 to seal an end recess formed therein. Liquid flows into the chamber 71 through a suitable means including a tube 67 connecting such chamber to the fitting 66. The block 70 also has ports or bores 73 and 74 formed in aligned portions of the wall forming the chamber 71, and short sections of hose 75 are provided and are suitably connected to fittings or other means engaging these bores 73 and 74 so that the chambers 71 are formed in each of the spray heads 50 and 150 are connected to each other by the fittings and hose sections 75 provided so that a continuous, endless flexible hose, in effect, is formed by the hose sections 75 and the various heads to which the hose sections are connected. Hence, incoming fluid flows from the rotary coupling 66 through the connector member or hose 67 to the chamber 71 provided in the spray head 150 and from it to all of the spray heads for pressure discharge therefrom when permitted. The extension arm 64 can be secured in any suitable manner, as by welding, to the spray head 150, and moves as a unit therewith.

It will be realized that the sprocket 59 is driven in a suitable manner by conventional means so that the spray heads will be moved along in a fixed course below the worm 13 but with the spray heads being moved at a longitudinal speed equal to that of movement of bottles or containers along the worm 13 so that such spray heads are positioned below and parallel to the containers being processed for a portion of their movement.

The drawings show that a pair of jet spray nozzles 77 and 78 are positioned on and carried by each of the spray heads 50 and 150 extend upwardly therefrom. The spray heads are so positioned on the endless roller chain 51 that the individual spray nozzles 77 and 78 are located in the same spaced relationship as are the plurality of containers being processed in the apparatus and being moved longitudinally by the worm 13. The spray nozzles are aligned with the bottles so that vertically upwardly directed jets or spray from the spray nozzle 77 and 78 will squirt into the inverted bottles and impinge on the upper inside ends thereof with the spray material then flowing down around the inner walls of the bottle and out of the inverted open mouth of the bottle. The apparatus has any suiable means, such as a large collection pan 79, provided as the lower portion of the apparatus and suitably secured to the frame 11, whereby the rinse fluid used in the apparatus will readily flow down into the pan 79 for drainage or other disposal action.

So as to provide rinsing material only when desired, each of the spray heads has a valve 80 sidably positioned in the block 70 and with such valve 80 normally being forced against a suitable valve seat 81 secured to the axially inner end of the chamber 71. A conventional member, such as a coil spring 82, resiliently biases the valve 80 against the seat 81 at all times, and the axially outer end of the spring preferably is abutted against a resilient seat or sealing pad 83 positioned at the axially outer end of the chamber 71. These valves 80, in turn, are controlled by means of a guide or cam bar 84 that is positioned horizontally in the frame 11 so that it is immediately adjacent the inner ends of the spray heads as moved through the upper portion of the orbital courses of their movement. Each of the blocks 70 has a bracket arm 85 or equivalent flange means extending therefrom, and a cam follower arm 86 is pivotally secured to each of these bracket arms 85 and is movable in a horizontal plane. A roller or cam 87 is journalled on each of these cam followed arms 86 and protrudes laterally inwardly of the apparatus a short distance so that these cams or rollers 87 engage an associated edge of the cam bar 84 when the roller chain 51 is being moved through its upper course of movement. The cam follower arm 86 is in engagement with an axially inner end of the valve 80 which extends from each of the blocks 70 a short distance so that axial movement of the cam follower arm 86 in the direction indicated by the arrow 88 will move the valve 80 off of its valve seat 81 and fluid from the chamber 71 hence will flow through the valve seat into a center bore 89 in each of the blocks 70. Side or connecting bores 90 and 91 extend from this center bore 89 and connect to the individual spray nozzles 77 and 78 provided on the spray heads whereby two spray nozzles are supplied with rinsing fluid or liquid from one control valve associated with the individual spray heads. Hence, spray material only will be released from the different spray heads as they are moved along the upper horizontal course of their orbital movement.

Usually the rinsing action is only provided for a portion of the longitudinal movement of the inverted bottles or containers through the apparatus, and this is indicated in FIG. 1 of the drawings.

Adjacent the discharge end of the apparatus 10, a bottle inverting means 100 is provided and is diagrammatically shown. The means 100 is the equivalent of the bottle inversion means 30 described hereinbefore with the exception that, in this instance, the bottle inversion means are positioned in general over the upper portion of the driven worm 13 and are adapted to hold bottles in engagement with the worm and threads 17 thereon for movement of the bottles 180° around the periphery of the worm with driven longitiudinal progressive movement of the bottles along wih the worm so that they are uprighted by the means 100 and then can be deposited upon any suitable discharge means, such as a receiving conveyor 101 or the like.

In some instances, it is desirable to use an air rinsing or cleaning means in association with the containers being processed, rather than an actual liquid rinse action. Hence, FIG. 9 shows a modified type of a spray head indicated as a whole by the numeral 110. Such spray head is in general similar with the spray heads 50 and 150 referred to hereinbefore and as shown, for example, in FIG. 8 of the drawings. However, in this instance, rather than having fixed spray nozzles 77 or 78 extending up from the spray head 110, a pair of tubular members, only one of which is shown in the drawings, and indicated by the numeral 111, is operatively secured to and extends upwardly from the spray head 110. The member 111 connects to a bore 112 formed in a block 113 from which the spray head 110 is formed whereby air, or other fluid can pass into the spray head through the bore 112 and flow to the tubular member 111. A piston 114 is received in a suitable sealed but slidable engagement with the bore of the tubular member 111 and it has a spray nozzle 115 secured thereto and extending upwardly therefrom. A spring 116 is positioned in the tublar member and resiliently urges the piston 114 at all times down to the lowermost portion of the tubular member 111 but with air pressure when introduced into the bore 112 flowing into the tubular member 111 and urging the piston 114 upwardly. This piston 114 has a small bore 117 formed therein and connecting to the bore of the spray nozzle 115. With the relatively large area of the piston 114 in relation to the size of the bore 112 and the diameter of the bore in the spray nozzle 115, air will flow through this bore 117 into the spray nozzle for discharge. At the same time, the piston 115 will be moved upwardly whereby the upper end of the spray nozzle 115 will be inserted into an associated container 118 being processed in the apparatus of the invention so that such spray nozzle 115 will move along with the container 118 for a portion of its movement along a fixed path in the apparatus so that air will be blasted into the containers or bottles for an air cleaning and/or rinsing action therein. When the endless roller chain controlling the various spray heads 110 approaches the end of its horizontal course of movement, then the air pressure supply will be terminated to the bores 112 prior to any arcuate movement of the spray heads 110 so that the spray nozzles 115 will drop back into the full line position shown in FIG. 9, from the dotted line position which they had previously taken. Air will escape from the tubular member 111 through the bore 117. The containers 118 can proceed on their horizontal course of movement while the spray heads 110 are moved through the remainder of their fixed orbital course to a downstream horizontal course of movement.

Of course the structure shown in FIG. 9 can be used for spray of a rinsing fluid, if desired. Fluid is supplied under pressure to the spray heads 110 by means like that described hereinbefore and a valve like the valve 80 will control supply of compressed fluids to the tubular member 111.

To aid in retaining the spray heads 50 and 150 in a fixed upper course of movement, a guide bar 120 is provided and carried by the frame 11 above such upper course of movement. Rolls 121 and 122 are suitably journalled on the frames 70 at spaced portions thereof. These rolls 121 and 122 extend above the frames to engage the guide bar 120 and aid in providing the accurate upper course of movement of such spray heads. The spray heads are centrally attached to the roller chains 52 and 53 by brackets 123.

In view of the above, it is believed that an effective, low cost and positive acting apparatus has been provided by the invention for rinsing a plurality of containers automatically and at a relatively high rate of speed, and/or for inverting bottles or containers, so that the objects of the invention have been achieved.

What is claimed is:

1. In a container rinsing apparatus, the combination of a driven worm, and means for supplying upright cylindrical containers to said worm for engagement therewith, the thread pitch of said worm being slightly larger than the diameters of said containers, the improvement comprising
    curved elongate means for engaging said containers, retaining them in engagement with said worm and for inverting said containers,
    guide means engaging said inverted containers and retaining them in engagement with said worm for movement therealong in a fixed horizontal path,
    driven means movable along under said fixed path at the same speed as said containers are moved by said worm for injecting streams of fluid into said inverted containers for rinsing action, and
    curved elongate means for engaging said inverted containers, retaining them in engagement with said worm, and for turning said containers upright.

2. In a container rinsing apparatus as in claim 1 where said driven means comprise an endless, roller chain means having an upper course positioned below and parallel to at least a portion of said fixed path, a plurality of spray heads secured to said endless means, endless tube means carried by said chain means and connected to each of said spray heads, and means connecting to said tube means to supply fluid thereto.

3. In a container rinsing apparatus as in claim 2 where said spray heads each include a pair of jet outlets connected to said tube means, a valve means is provided in each of said spray heads operatively positioned between said tube means and said jet outlets, and control means are operatively connected to said valve means to open the same only when said endless chain means moves through said upper course.

4. In a container rinsing apparatus as in claim 1 where guide means retain said inverted containers in engagement with said worm, and an elongate brush means is positioned to engage shoulders of said inverted containers to support them for movement along said worm.

5. In a container rinsing apparatus as in claim 1 where said driven means include a plurality of spray heads positioned for orbital movement having an upper course below and parallel to a portion of said fixed path, means connecting to said spray heads to supply compressed air thereto, and each spray head includes an air cylinder, a piston slidable in said cylinder and in upwardly extending air jet nozzle secured to said piston, said piston having an aperture therethrough connecting to said jet nozzle whereupon with air flow to said cylinder, said piston and jet nozzle are forced upwardly and said jet nozzle can be inserted into a container thereabove.

6. In a container rinsing apparatus, the combination of a driven worm, and means for supplying upright cylindrical containers to said worm for engagement therewith, the thread pitch of said worm being slightly larger than the diameters of said containers, the improvement comprising
    curved elongate means for engaging said containers, retaining them in engagement with the bottom portion of said worm and for inverting said containers,
    guide means engaging said inverted containers and retaining them in engagement with said worm for movement therealong in a fixed horizontal path,
    driven endless means including spaced spray nozzle movable along under said fixed path at the same speed as said containers are moved by said worm for injecting streams of fluid into said inverted containers for rinsing action, said spray nozzles being spaced the pitch of said threads on said worm,
    said spray nozzles being vertically upwardly directed and being vertically aligned with containers engaged by said worm, said endless means having orbital movement including an upper course below and parallel to said fixed path for at least a portion thereof, and
    curved elongate means for engaging said inverted containers, retaining them in engagement with the upper portion of said worm, and for turning said containers upright.

7. In a container rinsing apparatus as in claim 6 where means connect to said spray nozzles to supply fluid thereto, a valve means is operatively connected to each of said spray nozzles, and means are operatively connected to said valve means to open the same only when said driven endless means moves through said upper course.

8. In a container rinsing apparatus as in claim 6 where means connect to said spray nozzles to supply compressed air thereto, and each spray nozzle has an air cylinder, and a piston slidable in said cylinder associated therewith, said spray nozzle being secured to said piston, said piston having an aperture therethrough connecting to said spray nozzle so that air flow to said cylinder, said piston and spray nozzle are forced upwardly and said spray nozzle can be inserted into a container thereabove.

9. In a container rinsing apparatus, the combination of a driven worm, and means for supplying cylindrical containers to said worm for engagement therewith, the thread pitch of said worm being slightly larger than the diameters of said containers, the improvement comprising
    guide means engaging said containers and retaining them in engagement with said worm for movement therealong in a fixed horizontal path, said containers being inverted,
    driven endless means including spaced spray nozzle movable along under said fixed path at the same speed as said containers are moved by said worm for injecting streams of fluid into said inverted containers for rinsing action, said spray nozzles being spaced the pitch of said threads on said worm,
    said spray nozzles being vertically upwardly directed and being vertically aligned with containers engaged by said worm, said endless means having orbital movement including an upper course below and parallel to said fixed path for at least a portion thereof, and
    means operatively connecting to said endless means to supply rinsing fluid under pressure thereto.

10. In a container rinsing apparatus as in claim 9, the improvement of
    means spaced axially from said guide means for engaging said containers and for turning them 180° on their longitudinal axis and comprising an elongate curved plate to retain said containers in engagement with said worm, and side strips operatively secured to said plate to engage base and neck portions of said containers as they are being turned and moved longitudinally by said worm.

References Cited
UNITED STATES PATENTS

| | | | |
|---|---|---|---|
| 1,411,288 | 4/1922 | McGowan | 134—65 |
| 1,850,067 | 3/1932 | Ayars | 134—132 |
| 2,184,100 | 12/1939 | Mondloch | 134—132 XR |
| 2,298,475 | 10/1942 | Fechheimer | 15—304 XR |
| 2,529,199 | 11/1950 | Stover | 141—91 XR |
| 2,665,697 | 1/1954 | Hohl et al. | |
| 2,915,773 | 12/1959 | Whelan | 15—304 |
| 2,967,321 | 1/1961 | Whelan | 15—304 |

DANIEL BLUM, Primary Examiner

U.S. Cl. X.R.

134—132, 167; 198—33

PO-1050
(5/69)

UNITED STATES PATENT OFFICE
CERTIFICATE OF CORRECTION

Patent No. 3,495,291      Dated February 17, 1970

Inventor(s) Bruce G. Copping et al.

It is certified that error appears in the above-identified patent and that said Letters Patent are hereby corrected as shown below:

Claim 6, line 16, change "nozzle" to -- nozzles --

Claim 8, line 44, after "that", insert -- on --

Claim 9, line 56, change "nozzle" to -- nozzles --

SIGNED AND
SEALED
JUL 21 1970

(SEAL)
Attest:

Edward M. Fletcher, Jr.
Attesting Officer

WILLIAM E. SCHUYLER, JR.
Commissioner of Patents